Figure 1:
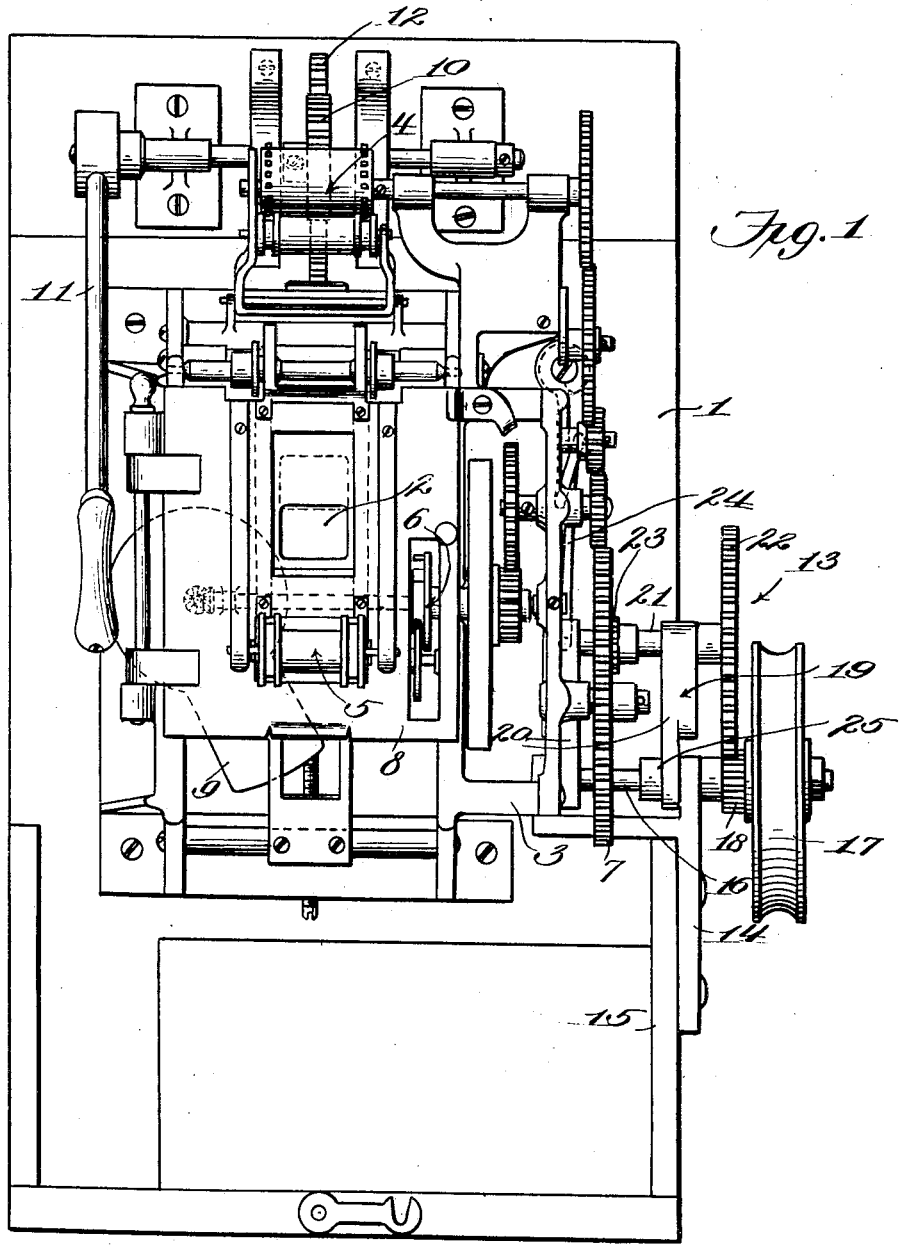

J. CHAMBLESS.
MOTOR ATTACHMENT FOR MOTION PICTURE EXHIBITORS.
APPLICATION FILED MAY 24, 1910.

973,917.

Patented Oct. 25, 1910.

2 SHEETS—SHEET 1.

Witnesses:

Inventor
James Chambless

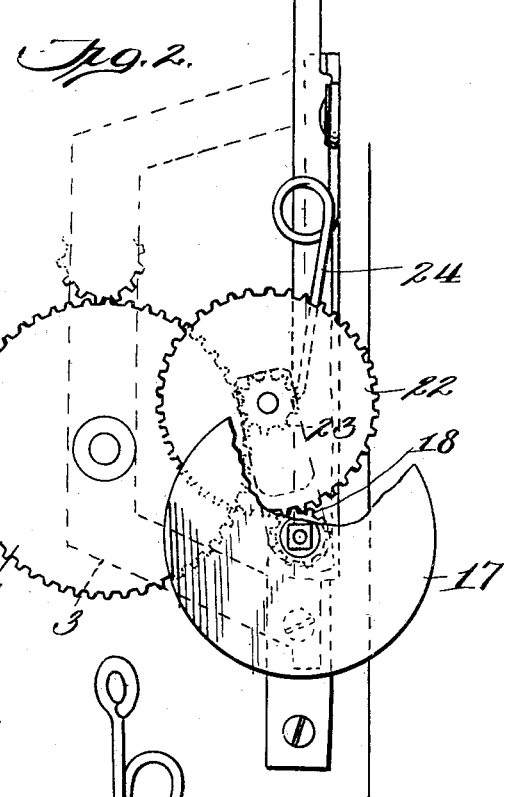
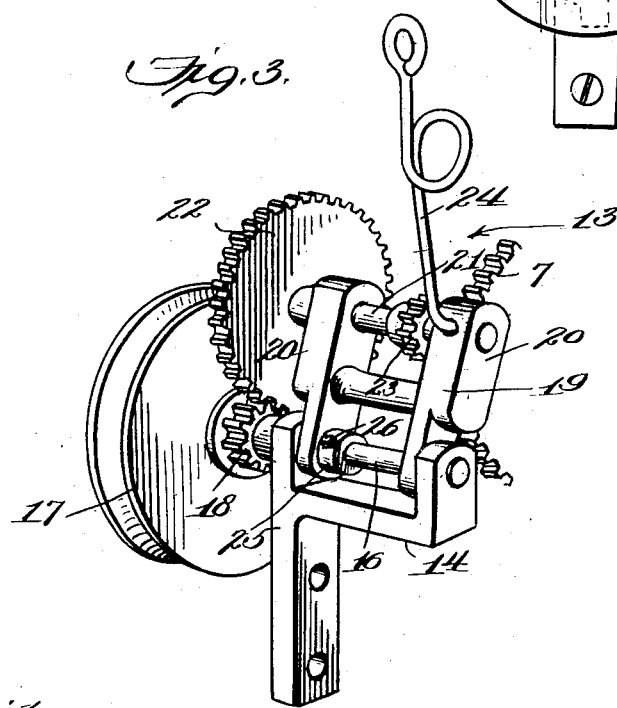

UNITED STATES PATENT OFFICE.

JAMES CHAMBLESS, OF EVANSVILLE, INDIANA.

MOTOR ATTACHMENT FOR MOTION-PICTURE EXHIBITORS.

973,917. Specification of Letters Patent. Patented Oct. 25, 1910.

Application filed May 24, 1910. Serial No. 563,164.

*To all whom it may concern:*

Be it known that I, JAMES CHAMBLESS, a citizen of the United States, residing at Evansville, in the county of Vanderburg and State of Indiana, have invented new and useful Improvements in Motor Attachments for Motion-Picture Exhibitors, of which the following is a specification.

This invention relates to improvements in motor attachments for motion picture exhibitors of that type which includes a sliding or shiftable frame supporting the film carrying mechanism and provided in order to insure the proper "framing" or alinement of the film sections with the projection aperture under all conditions of operation. Exhibitors of the type referred to have usually been operated by hand.

The present invention proposes a motor driving attachment which is constructed in a novel manner and with special regard to the movement of the sliding or shiftable frame whereby the relation of the driving parts is automatically maintained irrespective of the position of the frame and of course without interrupting or otherwise affecting the operation of the apparatus.

An embodiment of the invention is illustrated in the accompanying drawings which comprise—

Figure 1, an elevation of a known construction of motion picture exhibitor equipped with a motor attachment in accordance with the present invention; Fig. 2, a detail side elevation of the attachment and the machine parts adjunctive thereto; and Fig. 3, a detail perspective view of the attachment *per se*.

Similar characters of reference designate corresponding parts throughout the several views.

The particular construction of motion picture exhibitor herein disclosed is to be regarded simply as exemplifying an application of the invention and is of known construction, being illustrated and described at length in the U. S. Patent to A. E. Smith, #673329 of April 30, 1901. For this reason the machine will only be referred to in a general way and in sufficient detail to identify the relation of its parts with the present improvement.

The example of machine disclosed includes a base board 1, provided with a projection aperture 2 and supporting a vertically slidable frame 3. The latter carries the various operating parts, *e. g.* the upper film feeding and guiding mechanism 4, the lower film feeding and guiding mechanism 5, the Geneva stop gear 6 to drive the latter, the main driving pinion 7, the gearing which connects the pinion 7 and the Geneva stop gear, the gearing which connects the pinion 7 and the sprocket spool shaft of the upper film feeding and guiding mechanism, the light window or frame 8 which is traversed by the film, the shutter 9 for excluding the light from the screen in the intervals of movement of the film sections, and the pinion sector 10 and its operating handle 11, by means of which the frame 3 and the parts supported thereby may be raised or lowered, the sector for this purpose coöperating with a rack bar 12, mounted upon the base board 1.

The motor attachment which forms the subject matter of the present invention is designated generally by the numeral 13 and serves as a transmission train between the motor (not shown) and the main driving pinion 7.

The attachment 13 is of self-contained construction and its operating parts are supported by a bracket, as 14, having an upper U-shaped portion and a depending leg. The latter is bolted or otherwise secured to an extension 15 of the base board 1 and the U-shaped portion disposed above said extension, projects laterally and inwardly therefrom. The side members of the U-shaped portion are apertured and constitute bearings for a transverse shaft, as 16, which, on its outer end, carries a belt wheel, as 17, and a small pinion, as 18, the wheel 17 being connected to the driving motor aforesaid by a belt (not shown). The shaft 16 constitutes also a pivot for a swinging bracket, as 19, which includes parallel connected arms 20, constructed to serve as bearings for a shaft 21, the latter carrying at its outer end a large pinion 22 which is in mesh with and driven by the pinion 18, and carrying between the arms 20 a small pinion, as 23, which is in mesh with and drives the pinion 7. The fact that the bracket 19 is mounted for swinging movement, coupled with the fact of its relation to the shaft 16, permits of maintaining a permanent engagement of the pinion 23 with the pinion 7, irrespective of any changes in the position of the latter, incident to the vertical sliding movement of the frame 3. It is desirable to employ some positive means for this purpose, e. g. a torsion or leaf spring, as 24, having an end secured to the base board 1 and having a free end bearing against one of the arms 20 and tending to constantly hold the pinion 23 in engagement with the pinion 7, through the intermediary of the frame 19.

A simple and effective means for maintaining the assemblage of the various parts of the attachment consists of a collar, as 25, which is held upon the shaft 16 by a set screw, as 26, and which is positioned closely adjacent to one of the arms 20.

The improvement is of especial advantage by reason of its simplicity and inexpensiveness, its self-contained construction, its capability of ready assemblage and disassemblage, and its ready applicability to old machines as well as new.

Having fully described my invention, I claim:

1. The combination with a moving picture exhibitor including a base board having a projection aperture and a frame carrying the operating parts and also a driving pinion and which is vertically slidable to insure the proper alinement of the film sections with the projection aperture, of a motor attachment including a stationary bracket, a motor driven transverse shaft carried thereby, a swinging bracket mounted on the transverse shaft, a second transverse shaft carried by the swinging bracket, operative connections between the transverse shafts to drive the second shaft from the first shaft, and a pinion mounted on the second shaft for engagement with the driving pinion.

2. The combination with a moving picture exhibitor including a base board having a projection aperture and a frame carrying the operating parts and also a driving pinion and which is vertically slidable to insure the proper alinement of the film sections with the projection aperture, of a motor attachment including a stationary bracket, a motor driven transverse shaft carried thereby, a swinging bracket mounted on the transverse shaft, a second transverse shaft carried by the swinging bracket, operative connections between the transverse shafts to drive the second shaft from the first shaft, a pinion mounted on the second shaft for engagement with the driving pinion, and a spring associated with the swinging bracket to cause the latter to maintain the engagement of the last named pinion with the first named pinion.

3. The combination with a moving picture exhibitor including a base board having a projection aperture and a frame carrying the operating parts and also a driving pinion and which is vertically slidable to insure the proper alinement of the film sections with the projection aperture, of a motor attachment including a stationary bracket having a U-shaped portion, a transverse motor driven shaft journaled therein, a pinion mounted at one end of the shaft, a second bracket mounted for swinging movement on the transverse shaft, a collar secured on the latter and arranged adjacent to an arm of the swinging bracket, a second transverse shaft carried by the swinging bracket, and a pair of pinions mounted on the second shaft, one of which has constant engagement with the driving pinion and the other of which has constant engagement with the pinion on the first named shaft.

4. The combination with a moving picture exhibitor including a base board having a projection aperture and a frame carrying the operating parts and also a driving pinion and which is vertically slidable to insure the proper alinement of the film sections with the projection aperture, of a motor attachment including a stationary bracket having a U-shaped portion, a transverse motor driven shaft journaled therein, a pinion mounted at one end of the shaft, a second bracket mounted for swinging movement on the transverse shaft, a second transverse shaft carried by the swinging bracket, a pair of pinions mounted on the second shaft, one of which has constant engagement with the driving pinion and the other of which has constant engagement with the pinion on the first named shaft, and means for maintaining a constant operative relation between the driving pinion and the pinion coöperative therewith.

5. The combination with a moving picture exhibitor including a base board having a projection aperture and a frame carrying the operating parts and also a driving pinion and which is vertically slidable to insure the proper alinement of the film sections with the projection aperture, of a motor attachment including a stationary bracket having a U-shaped portion, a transverse motor driven shaft journaled therein, a pinion mounted at one end of the shaft, a second bracket mounted for swinging movement on the transverse shaft, a second transeverse shaft carried by the swinging bracket, a pair of pinions mounted on the second shaft, one of which has constant engagement with the driving pinion and the other of which has constant engagement with the pinion on the first named shaft, and a spring associated with the swinging bracket to cause the latter to maintain a constant operative relation between the driving pinion and the pinion coöperative therewith.

6. The combination with a moving picture exhibitor including a base board having a projection aperture, and a frame carrying the operating parts and also a driving pinion and which is vertically slidable to insure the proper alinement of the film sections with the projection aperture, of a motor attachment including a stationary bracket, a motor driven transverse shaft carried thereby, a second transverse shaft arranged for swinging movement through an arc concentric with the first shaft, operative connections between the transverse shafts to drive the second shaft from the first shaft, a pinion mounted on the second shaft for engagement with the driving pinion, and means for maintaining a constant operative relation between the pinions.

7. The combination with a moving picture exhibitor including a base board having a projection aperture and a frame carrying the operating parts and also a driving pinion and which is vertically slidable to insure the proper alinement of the film sections with the projection aperture, of a self-contained motor attachment including a movably mounted pinion for constant engagement with the driving pinion, a stationary motor driven element and operative connections between the motor driven element and the movably mounted pinion.

In testimony whereof I have hereunto set my hand in presence of two subscribing witnesses.

JAMES CHAMBLESS.

Witnesses:
WILLIAM HUDDY,
MORRIS PFOHL.